Patented Apr. 22, 1941

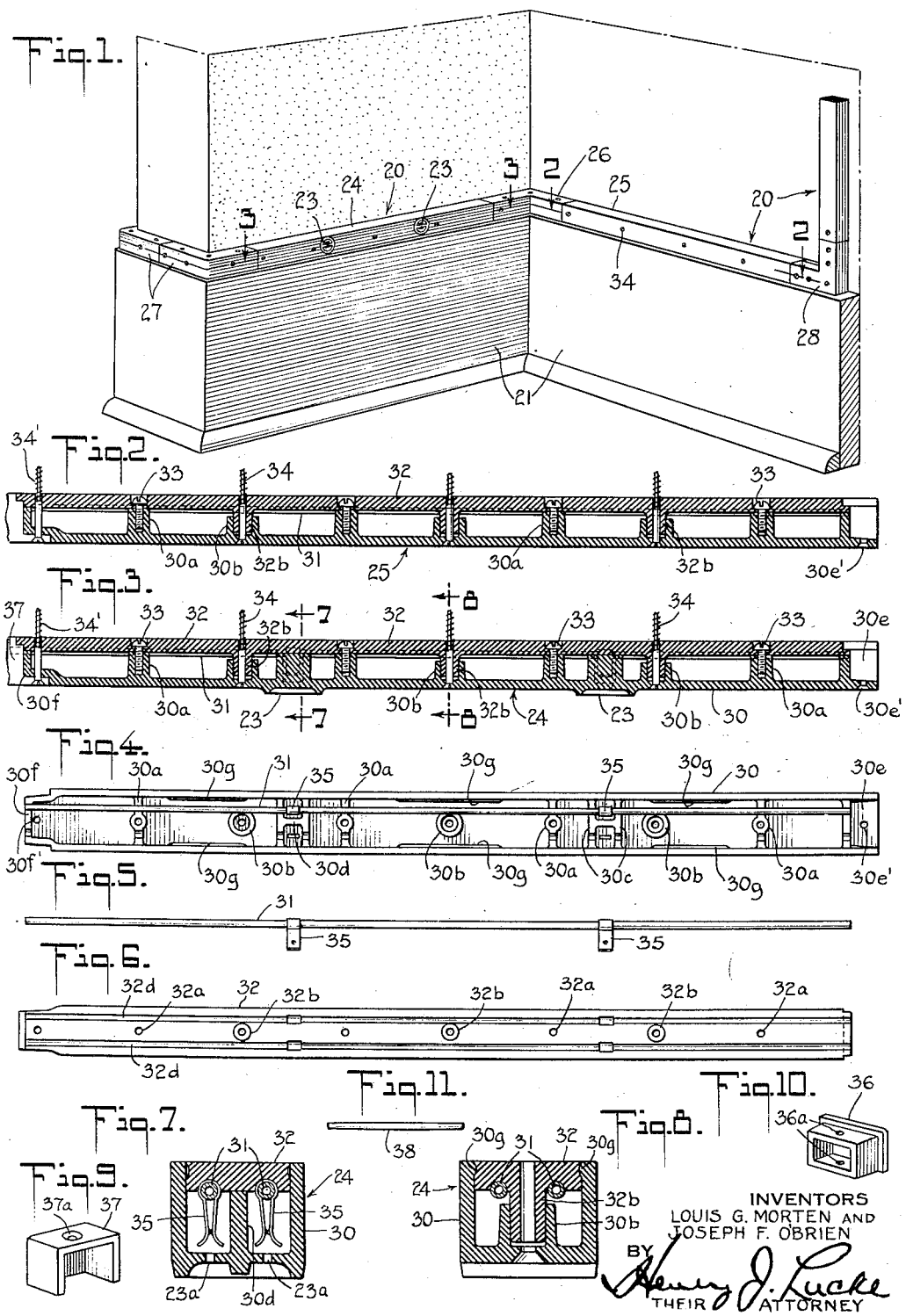

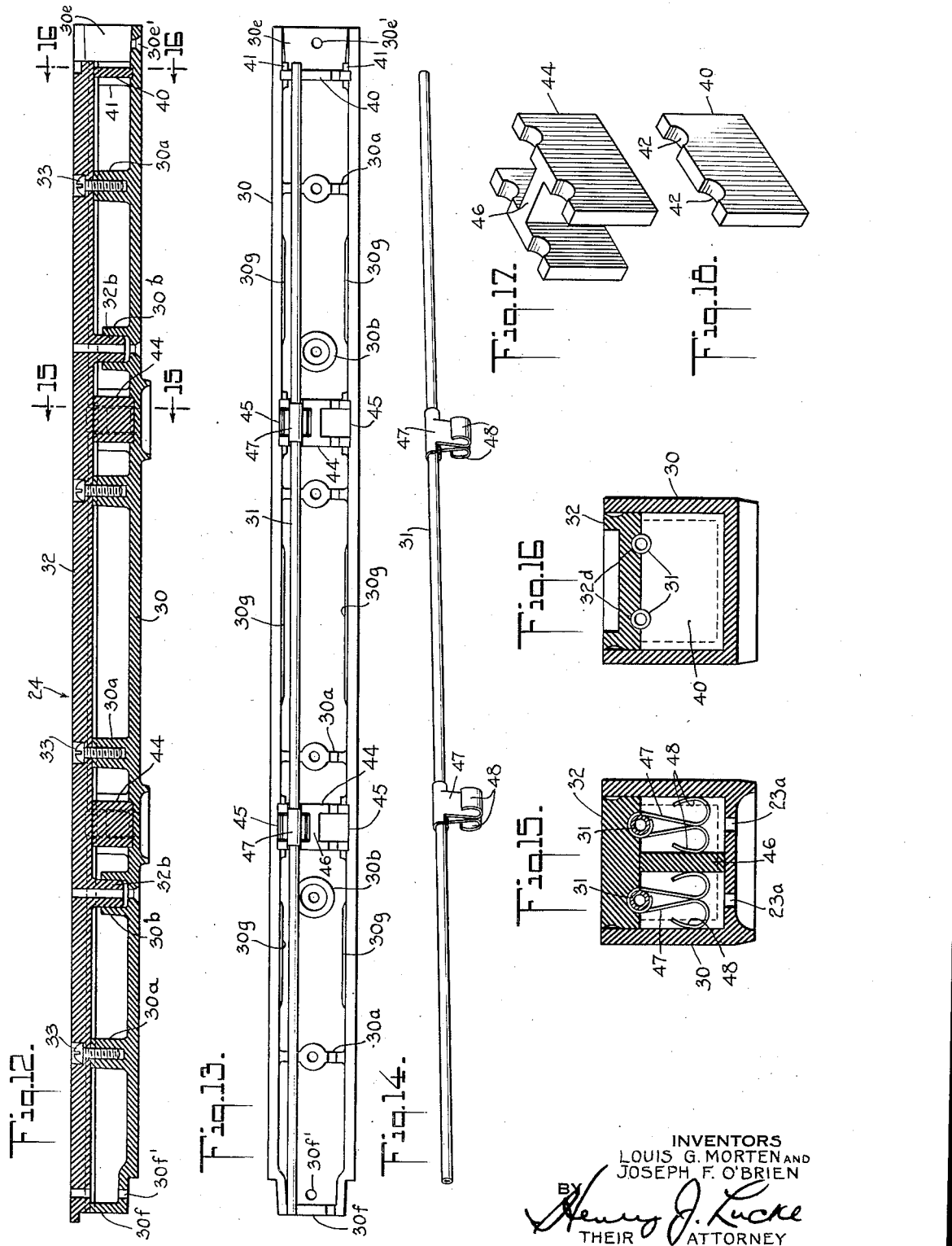

2,239,652

UNITED STATES PATENT OFFICE 2,239,652

ELECTRICAL UNIT

Louis G. Morten, Teaneck, and Joseph F. O'Brien, Jersey City, N. J., assignors to John B. Pierce Foundation, New York, N. Y., a corporation of New York Application September 14, 1940, Serial No. 356,844

19 Claims. (Cl. 173—334.1)

Our present invention relates to electrical units.

Our invention is applicable either as a unit per se or as a system of units connected in seriatim mechanically and electrically. In such system the units may be of substantially duplicate construction, certain of the units being constructed with one or more outlets, and other units not so arranged. Thus, when installing a system of serially connected units, the outlet provided units are placed at such locations in a room or other environment of installation, where it is desired to locate the electrical consumption devices to be energized, such as lamps, radios, fans, washing machines, ironing machines, etc.

Our present invention is particularly directed to an electrical unit the body of which is generally hollow and has an exterior configuration corresponding to the configuration desired for the unit. Desirably the body of the unit is formed of plastic material, possessing electrical insulating qualities. Within the hollow body are transversely extending parts or elements, which are provided with recesses for insulatedly receiving the electrical conductors. Such transversely extending parts may be integral with the body of the unit, or any or all of said parts may comprise removable bridge or wall members of insulation material.

The electrical conductors are affixed in position and held in the said recesses by suitable means, preferably carried by a rear member of the unit, which may also serve to seal the rear face of the body of the unit.

The body and the rear member preferably comprise complementary interfitting parts provided with registering openings through which screws or the like pass and serve to retain the body and the rear member in fixed relation and for securing the unit as an entirety to a suitable support.

This application is a continuation-in-part of our presently copending application Serial No. 286,734, filed July 27, 1939.

Further features and objects of the present invention will be more fully understood from the following detailed description and the accompanying drawings, in which Fig. 1 is a perspective view illustrating the application of our electrical wiring unit such as an electrical extension, as a molding for the baseboard of a room, etc.; the illustration depicts typical forms of variant contours corresponding to variant angles of meeting faces of the building structural parts involved in any given installation.

Fig. 2 is a horizontal sectional view of one embodiment of a single unit taken on line 2—2 of Fig. 1, on a somewhat enlarged scale. This unit is typical of embodiments of the invention having no provision for an outlet.

Fig. 3 is a horizontal sectional view of a single unit taken on line 3—3 of Fig. 1, on a somewhat enlarged scale. This unit is typical of embodiments of the invention having provision for an outlet, two outlets being illustrated.

Fig. 4 is a rear plan view of the body of the unit shown in Fig. 3, the rear, or cover, member being removed and one of the electrical conductors being omitted to expose otherwise hidden parts.

Fig. 5 is an elevation of an electrical conductor applicable for use in a unit of the type shown in Figs. 3 and 4.

Fig. 6 is a front face view of the cover member of the unit shown in Fig. 3.

Fig. 7 is a detail transverse sectional view taken on line 7—7 of Fig. 3, on a somewhat enlarged scale.

Fig. 8 is a detail transverse sectional view taken on line 8—8 of Fig. 3, the indicated securing screw being omitted.

Figs. 9 and 10 are perspective views of the end pieces of a unit embodying our invention, such as the units illustrated in Figs. 2 and 3; Fig. 9 shows an end piece for the male end and Fig. 10 an end piece for the female end.

Fig. 11 is an elevational view of one type of connector pin for interconnecting juxtaposed tubular ends of electrical conductors of corresponding polarity or phase.

Fig. 12 is a horizontal sectional view of a single unit of a second embodiment of our invention, corresponding to Figure 3.

Fig. 13 is a rear plan view of the body of the unit shown in Fig. 12, with the cover member and one of the electrical conductors omitted to more clearly show the relationship of the transverse bridge means to the body of the unit.

Fig. 14 is a perspective of one conductor of the unit of Fig. 12, illustrating a preferred form of spring contact for the outlet means of such unit.

Fig. 15 is a section, on enlarged scale, taken through 15—15 of Fig. 12, illustrating the manner in which the wing portions of the spring contacts bear against side walls of the body of the unit, to secure the electrical conductors of the unit against rotation within the body of the unit.

Fig. 16 is a section, on enlarged scale, taken through 16—16 of Fig. 12.

Fig. 17 is a perspective of a transverse bridge organization which, in addition to supporting the electrical conductors, affords a housing for the outlet contacts.

Fig. 18 is a perspective of an end wall closure member of the unit.

Referring to the drawings, Fig. 1 illustrates a system 20 of individual units embodying the invention, connected mechanically and electrically in seriatim as for serving as an electrical extension, molding for a baseboard 21, as a part of the structure of the room indicated in Fig. 1. Such system of units indicated in Fig. 1, may comprise a unit 24 which is provided with outlet means, in this instance two outlets 23, 23, being illustrated; also a unit 25 which is not constructed with any outlet means; also corner units of variant angular configuration such as the converging angular unit 26, the diverging angular units 27, the vertical angular unit 28, etc.

Pursuant to the present invention, such variantly configurated units have the construction typified by the outlet-provided unit 24, see Figs. 3 through 8 for one form of our invention and Figs. 12 et seq. for a second form, and the non-outlet-provided unit 25, see Fig. 2, as appears more fully hereinafter.

As above indicated, our variantly configurated units may be utilized as a single unit per se, also as appears hereinafter.

Referring now to Figs. 3 through 8, one form of unit 24 comprises a body 30 of shell formation, the cross-section of which is selected as desired, preferably of aesthetic appeal and approximately dimensioned to provide proper air-insulating spacing of the electrical conductors and for affording the mechanical requirements incident to the mechanical interfitting of the units serially when employed as a system. In the illustrated types, the cross-section is of a symmetrical polygon, namely of a rectangle.

For building structures having walls or partitions employing studding, it is desirable that the length of the unit when used singly, and the lengths of the plurality of units when used as a system, conform to the spacing between studding centers, to afford locating the end openings provided for in each unit through which screws or other fastening means pass, within the compass of the studdings, usually sixteen inches pursuant to building practice in this country.

Such body 30 is preferably substantially hollow typified by the showings of Figs. 3 and 4, and is desirably formed of electrically insulating material. Plastics serve as excellent material for the hollow unit body, embodying appropriate dielectric qualities, and afford by molding the provision of mutually spaced transversely extending parts or elements 30a, for receiving and retaining the one or more sets of electrical conductors 31. In the illustrated embodiment, these parts or elements 30a have two recesses in which the indicated two conductors are loosely received and air-spaced from one another, as also by the electrical insulating qualities of the material to electrically insulate the conductors from one another.

Coordinating with such body 30, the rear member 32 is constructed and arranged to secure the electrical conductors 31 in position within the retaining recesses of the transverse parts or elements 30a. Such rear member 32 is also of electrically non-conducting material.

To insure such securement of the electrical conductors, the rear member 32 is preferably formed, see Fig. 6, with perforations 32a for receiving suitable fastening elements such as the indicated screws 33 which thread into appropriate tapped openings in the parts or elements 30a.

Supplemental to such rear member, body and electrical conductor support and spacing means there may be further provided correlated means such as the socket elements 30b, projecting interiorly from the front wall of the body 30 and complementary male elements 32b projecting interiorly from the rear member 32, the front wall having perforations and the male elements 32b having registering openings through which project screws 34, or like fastening elements, which may serve also to retain the unit to a suitable support, such as the wall material indicated in Fig. 1.

The above referred to structural features are common to the illustrated non-outlet-provided unit 25 shown in Fig. 2 as well as to the outlet-provided unit 24 shown in Figs. 3 through 8.

As one form of outlet means for the unit 24, two outlets 23 in this instance being indicated, the paired mutually spaced traversely extending parts or elements 30c are provided, 30c with a septum part or element 30d forming individual housings, each part or element 30c having recesses for receiving the conductors 31, similarly as respects to the parts or elements 30a; and two apertures 23a are formed in the front wall of the body 30, appropriate for a two-pronged plug of an electric cord or cable. The contact clips or elements 35, see Figs. 4, 5 and 7, are conveniently soldered to the conductors 31, 31, at the appropriate locations thereon, such clips or elements 35 being disposed individually within the individual housings constituted by the parts or elements 30c, 30c, and the septum 30d.

Referring now to Figures 12 through 18, a second form of outlet provided unit 24 carries forward the essential features of construction of body 30 and base 32 hereinbefore described; said body and base are arranged for mutual securement through the agency of tapped bosses provided in the transverse walls 30a and the therewith cooperating screws 33. Also, the body is provided with socket elements 30b for association with the male elements 32b of the rear member 32.

It will be noted from Figures 13, 17, and 18, that the Figure 12 embodiment of outlet provided unit 24 employs any suitable number of removable transverse wall members for effecting the support of the conductors 31, rather than forming such transverse wall members integrally with the body 30 as disclosed in Figure 3. To this end, an end of the unit 24, desirably the socket end 30e, is provided with a removable transverse wall or bridge member 40, see Figure 18, formed of electrical insulation material and adapted to be held in operative position by suitable means, such as bosses 41, 41, provided in the side walls of the housing 30 to form slots to receive said bridge member 40. Said transverse wall 40 may or may not completely close the socketed end of the housing 30; the essential characteristics of such transverse wall are that the notches 42, 42 thereof register with the notches provided in the transverse walls 30a, to afford rigid support of the conductors 31 at frequent intervals.

To provide electrically insulating housings for the contact means for the outlet provided unit 24, the instant embodiment contemplates the use of an H-shaped removable structure 44, of which the parallel transverse walls are removably held within the body 30 of the unit as by slidable insertion into suitable grooves 45, 45 formed in the side walls of the body 30. Said transverse walls are joined by a preferably integral septum 46, the side walls of the structure 44 and the septum 46 cooperating with the walls of the body 30 to provide insulating pockets within which spring contact devices 47, 47 may be positioned. It will be noted that the stated structure 44 is provided with suitable matching grooves for the support of the conductors 31.

Said contact devices 47, 47 are soldered or otherwise secured to conductors 31. Referring to Figures 14 and 15, it will be noted that the spring contact members 47 are provided with wing portions 48, 48, said wing portions being of spring material and of such spread as to bear resiliently against the side walls of the pockets provided by the stated structures 44. In particular, as shown in Figure 15, the wing members 48 prevent a rotation of the conductors 31 and enhance the contact of the blades of an attachment plug with the contacts 47 by exerting a relatively strong pressure against such plug blades.

It will further be noted that the length of the contacts 47 approximates the spacing between the parallel transverse walls of the member 44, whereupon the contacts 47 prevent any appreciable longitudinal displacement of the conductors 31 within the body of the unit.

When the units 20 are employed as a single device, it is desirable to close the ends thereof, provision for which is suitably effected. Assuming the unit to be of standard construction applicable for connection in seriatim, the ends of the unit are arranged to preclude access from the exterior to the electrical conductors, one eminent arrangement for which comprises constructing one end of the unit, say the right end 30e of each of the units shown in Figs. 2, 3 and 4, of a socket or female formation and the opposite end 30f of male formation. For such constructions, an end member 36, see Fig. 10, contoured to fit and close such socket or female end of the unit, is provided with registering perforations 36a, in turn registering with the right end perforation 30e', see Figs. 2, 3 and 4, through which three perforations a screw or other fastening element, similar to the referred to screws 34 is passed and secured to a support, preferably to a studding of the building wall structure. Correspondingly, the end member 37, see Fig. 9, is constructed to fit and close the left hand end 30f of each of the units shown in Figs. 2, 3 and 4, and is provided with a perforation 37a adapted to register with a perforation 30f' for the reception, in the front wall of the body 30 and the end perforation 32c of the rear member 32, of a screw 34' for securing such end member to the unit and also desirably to a studding of the building wall structure or other suitable support.

Such end members 36, 37, or equivalent, are also employed to close the otherwise exposed ends of the extreme units of a system of units connected in seriatim.

For seriatim assembly of a plurality of the aforesaid types of units embodying the invention, it is advantageous to employ tubular electrical conductors, such as the illustrated conductors 31, 31, and to electrically interconnect seriatim conductors of corresponding polarity or phase by suitable conductor pins, see the pin 38, shown in Fig. 11, which is preferably tapered at its opposite ends to respectively frictionally fit into the end openings of the corresponding conductors of adjacent units. Such conductor pins function also to mechanically interconnect and align the units in seriatim, rigid mechanical connection being completed by fastening screws, see screw 34', Figs. 2 and 3, which indicates interconnection of serial units and also for securement of both units to a support.

The converging angular units such as the unit 26, see Fig. 1, and the diverging angular units 27, 27, and vertical angular units 28, are externally and internally constructed in correspondence to the structural features set forth hereinabove, the hollow body being formed or molded to appropriate configuration and the conductors bent or shaped correspondingly.

To afford self-securement of the rear member 32 relative to the body 30, it is desirable to provide a tongue and groove connection between the same, as by forming interior longitudinal tongues 30g at the rear open side of the body 30 and mating grooves in the opposite longitudinal edges of the rear member 32, see Figs. 7 and 8. Most preferably, the rear member 32 is molded of relatively soft rubber, thus providing self-conforming and relatively rigid mechanical connection and electrically insulating qualities.

The thickness of rear or base member 32 and the position of the longitudinal grooves therein with respect to the tongues 30g and the faces of the transverse elements 30a and 30c afford longitudinally extending grooves 32d for receiving such conductors 31, 31 and confining the same within the conductor-carrying recesses in such transverse elements. Upon forcing said rear member 32 internally relative to the body 30, the rear member snaps into tongue and groove engagement with the walls of the body 30, precluding accidental separation of the respective body and base members, or disarrangement of the conductors 31, 31.

From the foregoing it appears that our invention provides an electric conduit system unit adaptable for seriatim interconnection with like units, affording frequent electrical outlets along a run of such seriatim interconnected units, and in particular, providing a unit for such seriatim interconnection which may be constructed of molded body members, readily assembled and having positive means for fixedly securing electric conductors within the units. The securement of the electrical conductors is desirably effected by transverse wall means positioned at intervals within the substantially hollow body of the unit, said wall means having conductor-receiving notches for cooperation with longitudinal grooves in a removable base member for maintaining the conductors in insulated spaced relationship.

Whereas we have described our invention by reference to specific forms thereof, it will be understood that many changes and modifications may be made without departing from the spirit of the invention.

We claim:

1. A unit of an electrical conduit system of seriatim connected component units, said unit comprising a body of electrically insulating material, electrical conductors each having a length substantially the length of the body and having tubular terminals at each end of the body, members provided with recesses intermediate the ends of the body for insulatedly supporting the electrical conductors longitudinally of the body, walls for closing the ends of the body, and means extending substantially the length of the body for fixedly securing the electrical conductors in supported relation with said conductor supporting members and cooperating with said end walls for fixedly securing the tubular terminals of the conductors in predetermined uniform spaced relationship.

2. A unit of an electrical conduit system of seriatim connected component units, said unit comprising a substantially hollow body of electrically insulating material, electrical conductors each having a length substantially the length of the body and having tubular terminals at each end of the body, transverse members intermediate the ends of and integral with the body for insulatedly supporting the electrical conductors longitudinally of the body, walls for closing the ends of the body, and means extending substantially the length of the body for effecting a closure of the body and for fixedly securing the electrical conductors in supported relation with said conductor supporting members and cooperating with said end walls for fixedly securing the tubular terminals of the conductors in predetermined uniform spaced relationship.

3. A unit of an electrical conduit system of seriatim connected component units, said unit comprising a body of electrically insulating material, electrical conductors each having a length substantially the length of the body and having tubular terminals at each end of the body, transverse members intermediate the ends of and integral with the body for insulatedly supporting the electrical conductors longitudinally of the body, walls for closing the ends of the body, said end closing walls having recesses for receiving the tubular terminals of the electrical conductors, and means extending substantially the length of the body for fixedly securing the electrical conductors in supported relation with said transversely extending conductor supporting members and cooperating with the recesses of said end walls for fixedly securing the tubular terminals of the conductors in predetermined uniform spaced relationship.

4. A unit of an electrical conduit system of seriatim connected component units, said unit comprising a body of electrically insulating material, electrical conductors each having a length substantially the length of the body and having tubular terminals at each end of the body, transverse members intermediate the ends of and integral with the body for insulatedly supporting the electrical conductors longitudinally of the body, walls for closing the ends of the body, and means extending substantially the length of the body provided with recesses for fixedly securing the electrical conductors in supported relation with said transversely extending conductor supporting members and cooperating with said end walls for fixedly securing the tubular terminals of the conductors in predetermined uniform spaced relationship.

5. A unit of an electrical conduit system of seriatim connected component units, said unit comprising a body of electrically insulating material, electrical conductors each having a length substantially the length of the body and having tubular terminals at each end of the body, transverse members intermediate the ends of and integral with the body for insulatedly supporting the electrical conductors longitudinally of the body, walls for closing the ends of the body, said end closing walls having recesses for receiving the tubular terminals of the electrical conductors, and means extending substantially the length of the body provided with recesses for fixedly securing the electrical conductors in supported relation with said transversely extending conductor supporting members and cooperating with the recesses of said end walls for fixedly securing the tubular terminals of the conductors in predetermined uniform spaced relationship.

6. A unit of an electrical conduit system of seriatim connected component units, said unit comprising a body of electrically insulating material, electrical conductors each having a length substantially the length of the body and having tubular terminals at each end of the body, transverse members intermediate the ends of and integral with the body for insulatedly supporting the electrical conductors longitudinally of the the body, walls for closing the ends of the body, said unit having interfitting end formations precluding access to the electrical conductors at the junction of the unit with contiguous units, and means extending substantially the length of the body for fixedly securing the electrical conductors in supported relation with said transversely extending conductor supporting members and cooperating with said end walls for fixedly securing the tubular terminals of the conductors in predetermined uniform spaced relationship.

7. A unit of an electrical conduit system of seriatim connected component units, having the structure defined by claim 2, and further defined by the unit being provided with outlet apertures, and outlet contact clips secured to the electrical conductors and disposed within the body in substantial alignment with the outlet apertures.

8. A unit of an electrical conduit system of seriatim connected component units, having the structure defined by claim 2, and further defined by the closure means and the body being provided with mutually interfitting formations respectively extending interiorly of the body.

9. A unit of an electrical conduit system of seriatim connected component units, having the structure defined by claim 2, and further defined by the closure means and the walls of the body being provided with mutually related snap interconnection means.

10. A unit of an electrical conduit system of seriatim connected component units, said units comprising a body of electrical insulating material, said body having an open side, electrical conductors each having a length substantially the length of the body and having tubular terminals disposed at each end of the body, transverse members intermediate the ends of and integral with the body for insulatedly supporting the electrical conductors longitudinally within the body in fixed mutually spaced relationship, walls for closing the ends of the body, said end closing walls having recesses for receiving the tubular terminals of the electrical conductors, and a member extending substantially the length of the open side of the body for fixedly securing the electrical conductors in supported relation with said transversely extending conductor supporting members, and for fixedly securing the tubular terminals of the electrical conductors in predetermined uniform spaced relationship.

11. A unit of an electrical conduit system of seriatim connected component units, said unit comprising a body of electrically insulating material, electrical conductors each having a length substantially the length of the body and having exposed terminals at each end of the body, members disposed intermediate the ends of the body and provided with recesses for insulatedly supporting the electrical conductors longitudinally of the body, walls for defining the ends of the body, and means extending substantially the length of the body and in continuous engagement with the conductors for securing the electrical conductors in supported relation within said conductor supporting members and cooperating with said end walls for fixedly securing the terminals of the conductors at said end walls in predetermined uniform spaced relationship.

12. A unit of an electrical conduit system of seriatim connected component units, said unit comprising a body of electrically insulating material, electrical conductors each having a length substantially the length of the body and having tubular terminals at each end of the body for seriatim interconnection with conductors of like polarity of contiguous units, transverse members intermediate the ends of the body for insulatedly supporting the electrical conductors within the body, walls defining the ends of the body, and means extending substantially the length of the body and disposed wholly internally thereof for fixedly securing the electrical conductors in supported relation with said conductor supporting members and cooperating with said end walls for fixedly securing the tubular terminals of the conductors in predetermined uniform spaced relationship.

13. A unit of an electrical conduit system of seriatim connected component units, said unit comprising a substantially hollow body, electrical conductors each having a length substantially the length of the body and having terminals at each end of the body, members extending transversely of said body and removably mounted therein, said members having recesses for insulatedly supporting the electrical conductors, wall means for defining the ends of the body, and closure means of electric insulation material extending substantially the length of the body and positioned wholly internally thereof for insulatedly securing the electrical conductors in supported relation with said conductor supporting members and cooperating with said end defining walls for fixedly securing the terminals of the conductors in predetermined uniform spaced relationship.

14. A unit of an electrical conduit system of seriatim connected component units, said unit comprising a substantially hollow body, paired apertures provided in a face of said body, electrical conductors each having a length substantially the length of the body and provided with terminals at each end of the body, transverse wall means disposed within said body for supporting said conductors in insulated spaced relationship, means arranged within said body in registry with said apertures and defining compartments having walls of electrical insulation material, contact means provided on said electrical conductors in registry with said apertures and disposed within said insulating compartments, said contact means bearing resiliently against the walls of said insulating compartments and having a length substantially equal to the transverse length of said compartments, and means extending substantially the length of the body for insulatedly securing the electrical conductors in supported relation with said conductor supporting members and cooperating with said end defining walls for fixedly securing the terminals of the conductors in predetermined uniform spaced relationship.

15. A unit of an electrical wiring system of seriatim connected component units, said unit including a hollow body of which three sides are of rigid electrical insulation material, members integral with the body and extending transversely thereacross and having recesses disposed intermediate the side walls of the body, the recesses of each transverse member being in axial alignment and in a common plane with the corresponding recesses of each other transverse member, electricity conductors supportingly received within the recesses in said transverse members and extending continuously from end wall to end wall of the body and presenting exposed terminii at the end walls of the body, and plate means of electrical insulation material adapted to be inserted into the hollow body at the open side thereof to close said hollow body and having recesses in registry with the recesses of said transverse members to cooperate with said transverse members in securing the conductors and the terminals thereof in predetermined uniform spaced relationship.

16. A unit of an electrical wiring system of seriatim connected component units, said unit comprising a hollow body of electrical insulation material, one element of said body having one open side substantially coextensive with its length, members integral with such body element and extending transversely thereof from wall to wall of said body, said transverse members including members arranged to define end walls of said hollow body, all of said transverse members having recesses disposed intermediate the side walls of the body element and facing the open side thereof, the recesses of each transverse member being in axial alignment and in a common plane with the corresponding recesses of each other transverse member, electricity conductors extending continuously from end wall to end wall of the body and supportingly received within the recesses in said transverse members, said conductors presenting exposed terminii at such end walls, and plate means of resilient electrical insulation material adapted to be inserted into said hollow body element at the open side thereof to complete the closure of the hollow body and to cooperate with said transverse members in fixedly securing the conductors and the terminals thereof in predetermined uniform spaced relationship.

17. A unit of an electrical wiring system of seriatim connected component units, said unit comprising a hollow body of electrical insulation material, an element of said body having one open side substantially coextensive with its length, members integral with such body element and extending transversely thereof from wall to wall, said transverse members including members arranged to define end walls of said hollow body, all of said members having recesses disposed intermediate the side walls of the body element and facing the open side thereof, the recesses of each transverse member being in axial alignment and in a common plane with the corresponding recesses of each other transverse member, rigid tubular electricity conductors extending continuously from end wall to end wall of the body and supportingly received within the recesses in said transverse members, said conductors presenting exposed terminii at such end walls, and plate means of resilient electrical insulation material positioned internally of said body element at the open side thereof to complete the closure of said hollow body and to cooperate with said transverse members in fixedly securing the conductors and the terminals thereof in predetermined uniform spaced relationship.

18. A unit of an electric wiring system of seriatim connected component units, said unit including a three-sided substantially non-resilient hollow rectangular body of length greatly in excess of its depth and width, elements of electrical insulation material extending across said hollow body from side wall to side wall thereof and at spaced intervals along the length of said body, one of said elements defining an end wall of said hollow body, said members having recesses disposed in a lower face thereof, the recesses of each of said elements being in axial alignment and in a common plane with the corresponding recesses of each other element, rigid tubular electricity conductors extending continuously from end wall to end wall of said body and supportingly received within the recesses in said members, said conductors presenting exposed terminals at the end walls of said body, and plate means of compressible electrical insulation material positioned internally of said body and extending integrally from side wall to side wall of said body to close the said body, the said side walls of said body having longitudinal tongues and the said plate means having mating grooves formed in the edges thereof to afford a tongue and groove connection between said plate means and said hollow body, the said plate means when in such tongue and groove mating relation fixedly securing the conductors and the terminals thereof in predetermined uniform spaced relationship.

19. A unit of an electrical wiring system of seriatim connected component units, said unit comprising a three-sided body of rigid electrical insulation material, the length of said body being greatly in excess of its height and width, bridge members of electrical insulation material adapted to be positioned internally of said body and extending transversely thereof from side wall to side wall of said body, said body side walls having integral vertical bosses cooperating to form slots within which said bridge members may be removably housed, said bridge members having recesses arranged in the lower face thereof, rigid tubular electricity conductors extending continuously from end wall to end wall of the body and supportingly received within the recesses in said bridge members, said conductors presenting exposed terminii at the end walls of the body, plate means of resilient electrical insulation material adapted to be inserted into the hollow body at the open side thereof to close said hollow body and to cooperate with said bridge members in fixedly securing the conductors and the terminals thereof in predetermined uniform spaced relationship, said plate means contacting said lower face of said bridge members, and means for securing said plate means within said body whereby said bridge members may be firmly supported within said hollow body.

JOSEPH F. O'BRIEN.
LOUIS G. MORTEN.